US012795026B2

(12) United States Patent
Katayama

(10) Patent No.: US 12,795,026 B2
(45) Date of Patent: Nov. 10, 2026

(54) INFORMATION PROCESSING SYSTEM, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Natsuki Katayama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/176,522

(22) Filed: Mar. 1, 2023

(65) Prior Publication Data

US 2024/0106948 A1 Mar. 28, 2024

(30) Foreign Application Priority Data

Sep. 26, 2022 (JP) ................................ 2022-152823

(51) Int. Cl.
*H04N 1/00* (2006.01)

(52) U.S. Cl.
CPC ..... *H04N 1/00803* (2013.01); *H04N 1/00458* (2013.01); *H04N 1/00832* (2013.01)

(58) Field of Classification Search
USPC .......................................................... 358/474
See application file for complete search history.

(56) References Cited

U.S. PATENT DOCUMENTS 8,577,826 B2 * 11/2013 Berard .................. G06F 40/258 706/47
2014/0082566 A1 * 3/2014 Matsuo ................. G06F 3/0482 715/838
2021/0266416 A1 * 8/2021 Yamamoto ......... H04N 1/00644
2021/0306494 A1 * 9/2021 Yamamoto ........... H04N 1/0044

FOREIGN PATENT DOCUMENTS

JP 2017-175238 A 9/2017

OTHER PUBLICATIONS

Jul. 28, 2026 Office Action issued in Japanese Patent Application No. 2022-152823.

* cited by examiner

*Primary Examiner* — Jacky X Zheng
(74) *Attorney, Agent, or Firm* — Oliff PLC

(57) ABSTRACT

An information processing system includes one or more processors configured to: acquire attribute information indicating an attribute of a document containing one or more pages and split information indicating a result of splitting in units of documents after multiple documents are read consecutively; and estimate an error for each split document on a basis of a difference between a total number of pages in each document obtained from the attribute information and a number of read pages in each split document obtained from the split information.

20 Claims, 13 Drawing Sheets

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-152823 filed Sep. 26, 2022.

BACKGROUND

(i) Technical Field

The present disclosure relates to an information processing system, an information processing apparatus, and a non-transitory computer readable medium.

(ii) Related Art

A technology in which an electronic file generated by consecutively reading multiple documents is split in units of documents is known (for example, see Japanese Unexamined Patent Application Publication No. 2017-175238).

SUMMARY

With such a technology, the split result intended by the user may not be obtained due to incorrect insertion of an identification sheet used to identify the boundary between the previous and next documents, an analysis error with respect to the electronic file, or the like.

Aspects of non-limiting embodiments of the present disclosure relate to obtaining the split result intended by the user when an electronic file generated by consecutively reading multiple documents is split in units of documents.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including one or more processors configured to: acquire attribute information indicating an attribute of a document containing one or more pages and split information indicating a result of splitting in units of documents after a plurality of documents are read consecutively; and estimate an error for each split document on a basis of a difference between a total number of pages in each document obtained from the attribute information and a number of read pages in each split document obtained from the split information.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail and with reference to the attached drawings.

(Configuration of Information Processing System)

Figure 1:
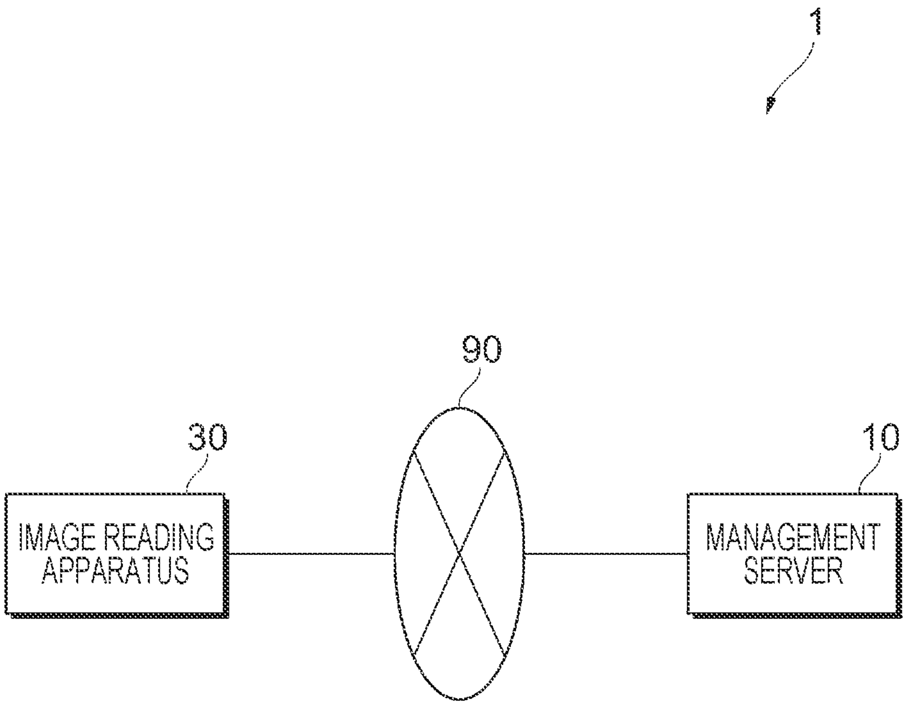
FIG. 1 is a diagram illustrating an example of the overall configuration of an information processing system to which the exemplary embodiment is applied.

FIG. 1 is a diagram illustrating an example of the overall configuration of an information processing system 1 to which the exemplary embodiment is applied. The information processing system 1 is formed by connecting a management server 10 and each image reading apparatus 30 through a network 90. The network 90 is, for example, a local area network (LAN), the Internet, or the like.

The management server 10 is an information processing apparatus acting as a server that manages the information processing system 1 as a whole. The management server 10 acquires information (hereinafter referred to as "attribute information") indicating attributes of documents on a paper medium containing one or more pages and information (hereinafter referred to as "split information") indicating a result of splitting, in units of documents, the data (hereinafter referred to as "bundle data") of a bundle of multiple documents generated as a result of consecutively reading the multiple documents. For example, the attribute information includes, for each document, the actual total number of pages in the document, identification information (hereinafter referred to as a "case ID") for uniquely identifying a case for the document, and identification information (hereinafter referred to as a "supervisor ID") for uniquely identifying a person in charge of handling the document or the like. The split information includes the data of each electronic document after splitting the bundle data in units of documents, the title of each document obtained from the result of optical character recognition (OCR) analysis performed on the body text of each read document, and information such as the number of pages read by the image reading apparatus 30.

Next, the management server 10 estimates an error for each split document on the basis of information (hereinafter referred to as "comparison information") related to a result of comparing the total number of pages in each read document obtained from the acquired attribute information and the number of read pages in each split document obtained from the split information. Here, the "number of read pages" refers to the number of pages read by the image reading apparatus 30. The management server 10 estimates an error for each document on the basis of a difference (hereinafter referred to as the "number of extra or missing pages" in some cases), obtained from the comparison information, between the actual total number of pages in each document and the number of read pages in each split document.

Thereafter, if an error is estimated to have occurred, the management server 10 transmits information indicating the error (hereinafter referred to as "error information") and information for resolving the error (hereinafter referred to as "error resolution information") to the image reading apparatus 30. Note that details regarding the configuration of, and processing by, the management server 10 will be described later.

Note that in the present exemplary embodiment, the units of documents are predetermined by the user. For example, a "purchase order" containing a single page may be handled as a single document, and a "contract" containing 10 pages may also be handled as a single document. Furthermore, a combination of a "quotation", "purchase order", "delivery slip", and "invoice" may also be handled as a single document.

The image reading apparatus 30 is an information processing apparatus that reads an image of text, figures, and the like formed on a recording medium such as paper, and generates a document on the basis of the image data. Examples of the image reading apparatus 30 include a scanner and a multi-function device. The image reading apparatus 30 generates bundle data by consecutively reading multiple documents, splits the bundle data in units of documents, and transmits the split data that is the result of splitting and the bundle data to the management server 10. Thereafter, if error information and error resolution information is transmitted from the management server 10, the image reading apparatus 30 acquires and displays the transmitted information to notify the user.

Note that the configuration of the information processing system 1 described above is an example, and it is sufficient if functions for achieving the above processing are provided in the information processing system 1 as a whole. Consequently, some or all of the functions for achieving the above processing may be allocated or achieved cooperatively within the information processing system 1. That is, some or all of the functions of the management server 10 may also be functions of the image reading apparatus 30, and some or all of the functions of the image reading apparatus 30 may also be functions of the management server 10. Moreover, some or all of the functions of each of the management server 10 and the image reading apparatus 30 included in the information processing system 1 may also be delegated to another server or the like not illustrated. This arrangement makes it possible to accelerate processing by the information processing system 1 as a whole and also cause processes to complement one another.

(Hardware Configuration of Management Server)

Figure 2:
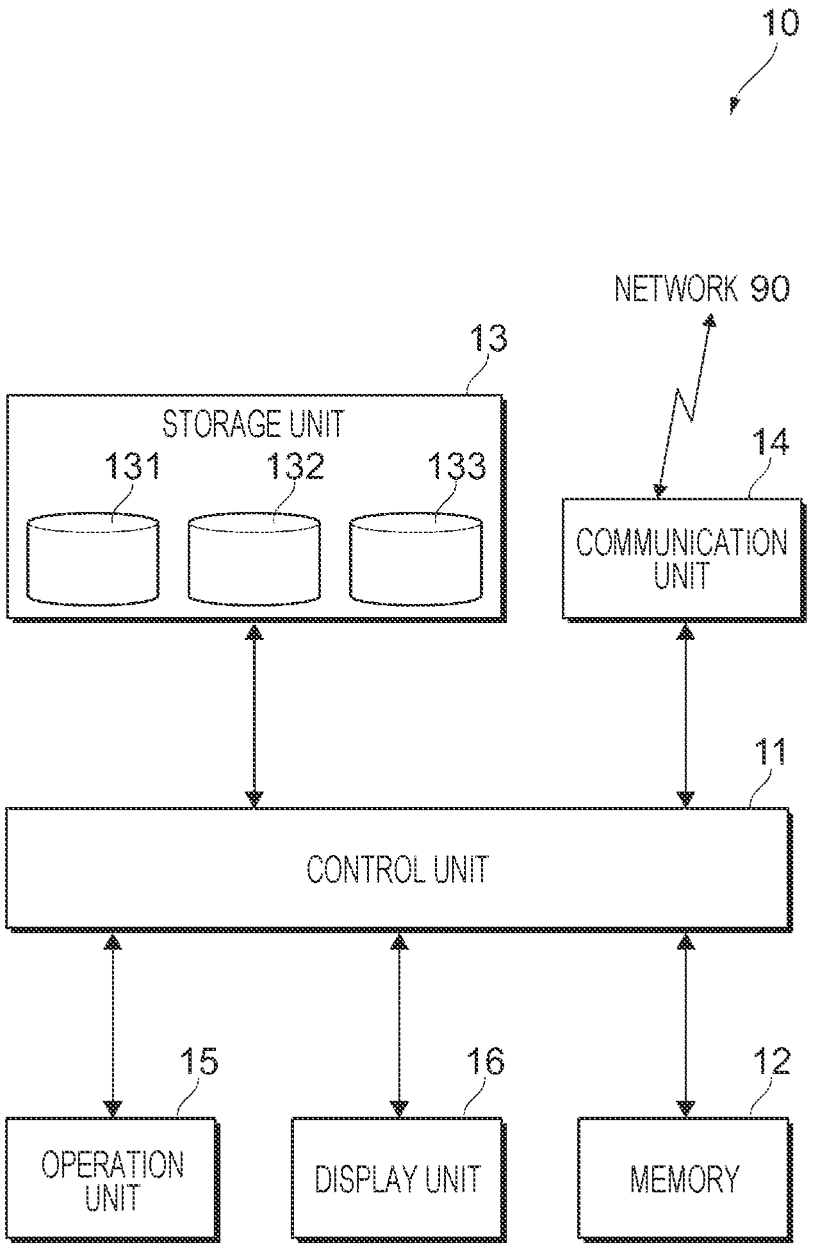
FIG. 2 is a diagram illustrating a hardware configuration of a management server as an information processing apparatus to which the exemplary embodiment is applied.

FIG. 2 is a diagram illustrating a hardware configuration of the management server 10 as an information processing apparatus to which the exemplary embodiment is applied. The management server 10 includes a control unit 11, a memory 12, a storage unit 13, a communication unit 14, an operation unit 15, and a display unit 16. These units are connected by a data bus, an address bus, a Peripheral Component Interconnect (PCI) bus, and the like.

The control unit 11 is a processor that controls the functions of the management server 10 through the execution of various software such as an operating system (OS; basic software) and application software. The control unit 11 includes a central processing unit (CPU), for example. The memory 12 is a storage area storing various software, data used in the execution of the software, and the like, and is also used as a work area when performing computations. The memory 12 includes random access memory (RAM), for example.

The storage unit 13 is a storage area that stores information such as input data for various software and output data from various software. The storage unit 13 includes a device such as a hard disk drive (HDD), a solid-state drive (SSD), or a semiconductor memory used to store programs and various settings data, for example. For example, an attribute database (DB) 131 storing attribute information, a split DB 132 storing split information, a document DB 133 storing each of the documents after splitting bundle data, and the like are stored in the storage unit 13 as databases for storing various information.

The communication unit 14 transmits and receives data with the image reading apparatus 30 and external equipment over the network 90. The operation unit 15 includes a keyboard, a mouse, and mechanical buttons and switches, for example, and receives input operations. The operation unit 15 also includes a touch sensor that is integrated with the display unit 16 to form a touch panel. The display unit 16 includes a liquid crystal display (LCD) or an organic light-emitting diode (OLED) display used to display information, for example, and displays image, text data, and the like.

(Hardware Configuration of Image Reading Apparatus)

Figure 3:
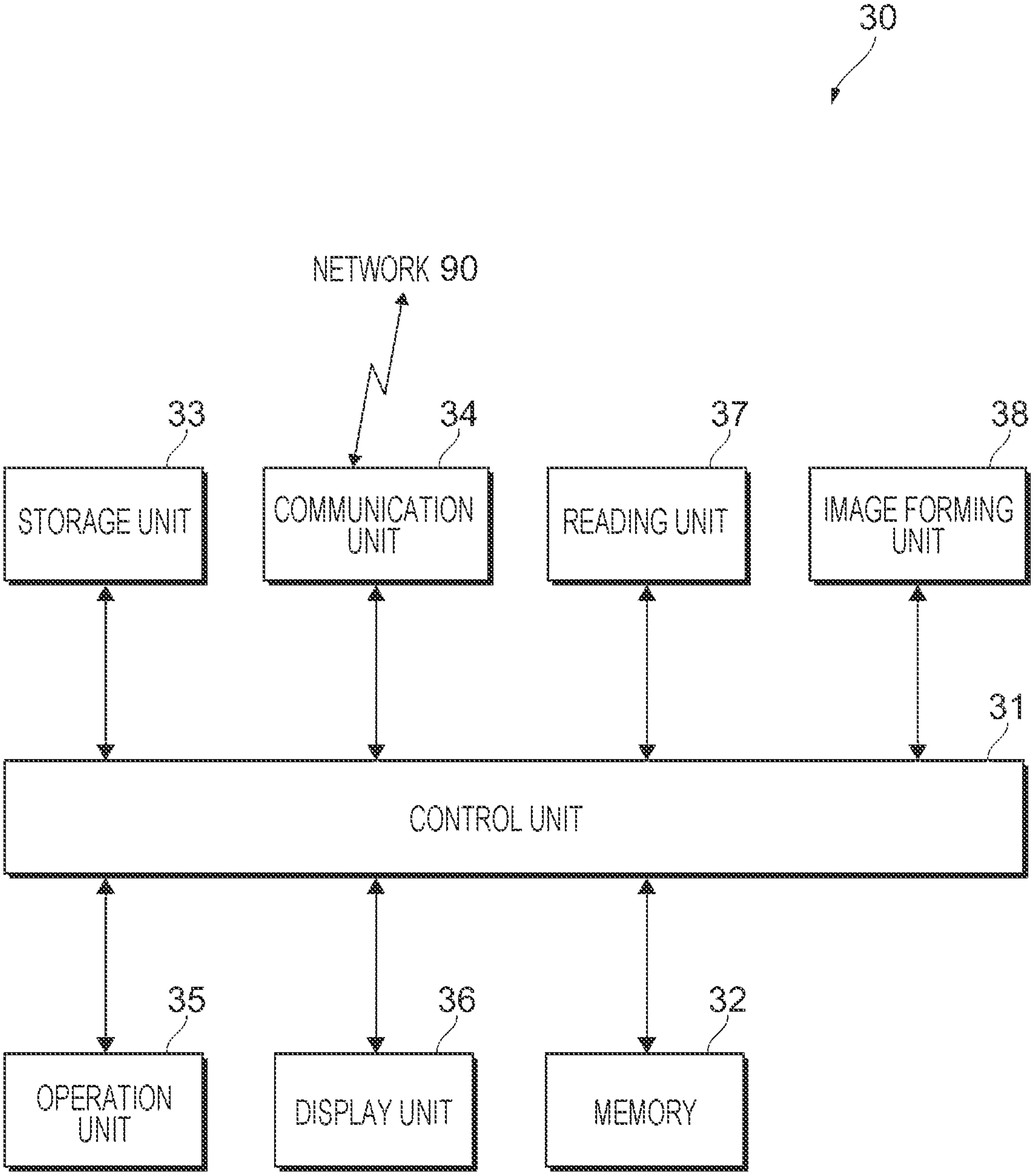
FIG. 3 is a diagram illustrating a hardware configuration of an image reading apparatus.

FIG. 3 is a diagram illustrating a hardware configuration of the image reading apparatus 30. The image reading apparatus 30 has a hardware configuration corresponding to each of the control unit 11, memory 12, storage unit 13, communication unit 14, operation unit 15, and display unit 16 in the hardware configuration of the management server 10 in FIG. 2.

Namely, the image reading apparatus 30 includes a control unit 31 formed from a processor such as a CPU, a memory 32 formed as a storage area in RAM or the like, and a storage unit 33 formed as a storage area in an HDD, SSD, semiconductor memory, or the like. The image reading apparatus 30 also includes a communication unit 34 that transmits and receives data with the management server 10 and external equipment over the network 90. The image reading apparatus 30 also includes an operation unit 35 including a keyboard, a mouse, a touch panel, or the like, and a display unit 36 including an LCD display, an OLED display, or the like.

Furthermore, in addition to the above components, the image reading apparatus 30 includes a reading unit 37 and an image forming unit 38. The reading unit 37 reads an image recorded on a medium such as paper (such as a document on a paper medium, for example) as the recording medium. The reading unit 37 includes, for example, a charge-coupled device (CCD) scanner in which light from a light source is radiated onto a document and the reflected light therefrom is focused by a lens and sensed by a CCD or a contact image sensor (CIS) scanner in which light from LED light sources is successively radiated onto a document and the reflected light therefrom is sensed by a CIS. In one example, the image forming unit 38 forms an image based on image data onto the printing surface of paper as a recording medium according to an electrophotographic system, an inkjet method, or the like. In addition, these units are connected by a data bus, an address bus, a PCI bus, and the like.

(Functional Configuration of Control Unit in Management Server)

Figure 4:
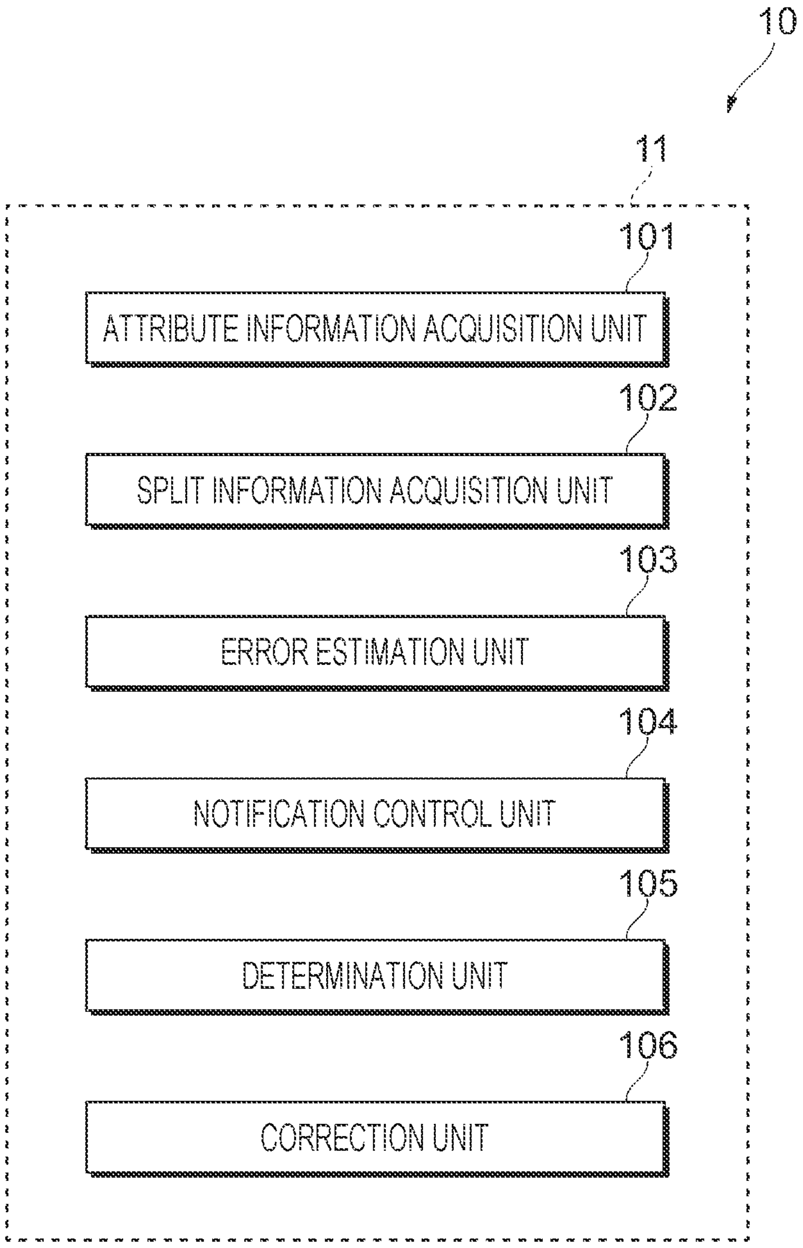
FIG. 4 is a diagram illustrating a functional configuration of a control unit of the management server.

FIG. 4 is a diagram illustrating a functional configuration of the control unit 11 of the management server 10. The control unit 11 of the management server 10 functions as an attribute information acquisition unit 101, a split information acquisition unit 102, an error estimation unit 103, a notification control unit 104, a determination unit 105, and a correction unit 106.

The attribute information acquisition unit 101 acquires attribute information for each document read consecutively by the image reading apparatus 30. Specifically, the attribute information acquisition unit 101 acquires, through the communication unit 14 (see FIG. 2), attribute information for each document transmitted from the image reading apparatus 30. The attribute information for each document acquired by the attribute information acquisition unit 101 is stored and managed in the attribute DB 131 (see FIG. 2) of the storage unit 13 (see FIG. 2).

In the present exemplary embodiment, the attribute information for each document is read by having the image reading apparatus 30 read a face sheet of each document. A "face sheet" refers to a sheet for identification purposes that is inserted over the top page of a document to be read. Identification information (for example, a QR Code®) associated with attribute information about the document is printed on the face sheet.

The split information acquisition unit 102 acquires bundle data and split information indicating the result of splitting the bundle data in units of documents. Specifically, the split information acquisition unit 102 acquires, through the communication unit 14, bundle data and split information transmitted from the image reading apparatus 30. The bundle data and split information acquired by the split information acquisition unit 102 is stored and managed in the split DB 132 (see FIG. 2) of the storage unit 13.

The error estimation unit 103 estimates an error for each split document on the basis of comparison information. Specifically, the error estimation unit 103 estimates an error for each document on the basis of a difference, obtained from the comparison information, between the total number of pages in each read document and the number of read pages in each split document. Among the split documents, the error estimation unit 103 estimates that an error has not occurred for a document with no difference between the actual total number of pages and the number of read pages, and for which attribute information exists, and estimates that an error has occurred for a document with a difference between the actual total number of pages and the number of read pages and a document for which attribute information does not exist.

When estimating an error for a split document, the error estimation unit 103 estimates the presence or absence of an error and the content of the error with consideration for the presence or absence of attribute information for each of the split document and a document before or after the split document, and the relationship of the difference between the actual total number of pages and the number of read pages. As an example, assume that attribute information exists for each of the split document and a document before or after the split document, and that the difference between the actual total number of pages and the number of read pages is complementary. In this case, the error estimation unit 103 estimates that an error of a "mistake in split position" has occurred. The error of a "mistake in split position" may occur in cases where one or more pages included in a document are mixed in with a different document before or after, for example.

As another example, assume that attribute information exists for each of the split document and a document before or after the split document, and that the difference between the actual total number of pages and the number of read pages is not complementary. In this case, the error estimation unit 103 estimates the presence or absence of an error and the content of the error on the basis of whether the actual total number of pages or the number of read pages is greater. Specifically, if the number of read pages is greater than the actual total number of pages, the error estimation unit 103 estimates that an error has occurred and estimates that the content of the error is at least one of an insufficient number of splits (hereinafter referred to as "missing split" in some cases) or an excessive number of read pages (hereinafter referred to as "extra document" in some cases).

Also, if the number of read pages is less than the actual total number of pages, the error estimation unit 103 estimates that an error has occurred and estimates that the content of the error is at least one of "extra split" or an insufficient number of pages in the document prior to being read (hereinafter referred to as "missing document" in some cases).

The notification control unit 104 causes a notification indicating the result of the estimation by the error estimation unit 103 to be given to the user. Specifically, as the control of the notification of the result of estimation to the user, the notification control unit 104 causes error information, that is, information indicating that an error is estimated to have occurred, and error resolution information, that is, information for resolving the error, to be transmitted to the image reading apparatus 30. For example, if the error information indicates that an error of "mistake in split position" has occurred, the notification control unit 104 causes a notification to be given in which information for correcting the split position is included as the error resolution information, for example. The information for correcting the split position may be, for example, a candidate for the split position that could resolve the error.

Also, if the content of the error obtained from the error information is "missing split", the notification control unit 104 causes a notification to be given in which information for increasing the number of splits is included as the error resolution information in cases that allow for an increase in the number of splits. Here, the "information for increasing the number of splits" may be, for example, a candidate for a new split position that could resolve the error.

Also, if the content of the error obtained from the error information is "extra document", the notification control unit 104 causes a notification to be given in which information for decreasing the number of read pages, for example, is included as the error resolution information. Here, the "information for decreasing the number of read pages" may be, for example, a candidate for a page that could be removed to resolve the error.

Also, if the error information indicates “extra split”, the notification control unit 104 causes a notification to be given in which information for decreasing the number of splits is included as the error resolution information in cases that allow for a decrease in the number of splits. Here, the “information for decreasing the number of splits” may be, for example, a candidate for a split position that could be removed to resolve the error. The notification control unit 104 also causes a notification to be given in which information for increasing the number of read pages is included as the error resolution information in cases that do not allow for a decrease in the number of splits. Here, the “information for increasing the number of read pages” may be, for example, a candidate for a page that could be added to resolve the error and a candidate for a position where the page is added. The “candidate for a page that could be added to resolve the error” may be a page included in a newly read document, for instance.

The determination unit 105 determines whether a newly read document is a document that has been read to replace a document with a difference between the actual total number of pages and the number of read pages. If an error occurs, the image reading apparatus 30 may re-read a document in some cases. In such cases, the user places a face sheet over the top page of the replacing document, loads the document into the image reading apparatus 30, and performs an operation for giving an instruction to start reading. With this arrangement, reading by the image reading apparatus 30 is started and an electronic document is generated. Thereafter, the determination unit 105 determines whether the newly read document is a document that has been read to replace a document.

Note that the method by which the determination unit 105 makes the above determination is not particularly limited. For example, the determination unit 105 may make the determination on the basis of a result of comparing features of the face sheet as attribute information for a document with a difference between the actual total number of pages and the number of read pages, and features of the face sheet as attribute information for a document that has been newly read as a replacement.

The correction unit 106 corrects the split information. Specifically, the correction unit 106 corrects the split information according to the content of information (hereinafter referred to as “correction instruction information”) inputted to indicate a correction to the split information and transmitted from the image reading apparatus 30. Specifically, the correction unit 106 makes the correction by moving a split position, merging split electronic documents, adding a split, removing a designated page among read pages, or the like.

(Functional Configuration of Control Unit of Image Reading Apparatus)

Figure 5:
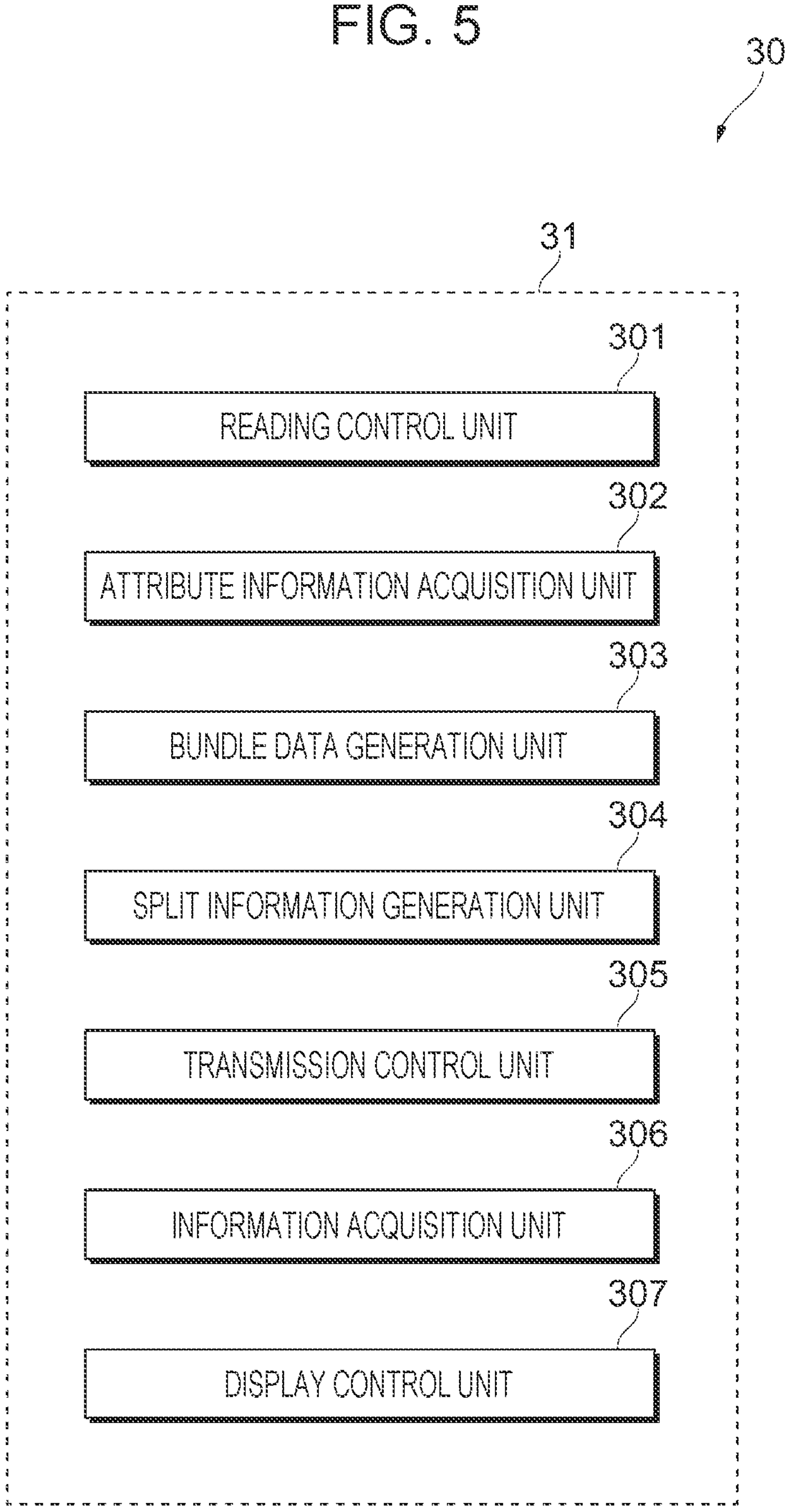
FIG. 5 is a diagram illustrating a functional configuration of the control unit of the image reading apparatus.

FIG. 5 is a diagram illustrating a functional configuration of the control unit 31 of the image reading apparatus 30. The control unit of the image reading apparatus 30 functions as a reading control unit 301, an attribute information acquisition unit 302, a bundle data generation unit 303, a split information generation unit 304, a transmission control unit 305, an information acquisition unit 306, and a display control unit 307.

The reading control unit 301 controls the reading unit 37 (see FIG. 3) to read multiple documents consecutively. When causing the reading unit 37 to read multiple documents, the reading control unit 301 also causes the reading unit 37 to read identification information printed on the face sheet included with each of the multiple documents. The attribute information acquisition unit 302 acquires attribute information associated with the identification information read by the reading unit 37.

The bundle data generation unit 303 generates singular bundle data containing the multiple documents read by the reading unit 37. The split information generation unit 304 generates split information indicating the result of splitting, in units of documents, the singular bundle data generated by the bundle data generation unit 303.

The transmission control unit 305 controls the transmission of various information to the management server 10 and external equipment. Specifically, for example, the transmission control unit 305 controls the transmission of attribute information acquired by the attribute information acquisition unit 302 and split information generated by the split information generation unit 304 to the management server 10 through the communication unit 34 (see FIG. 3).

The information acquisition unit 306 acquires various information transmitted from the management server 10 and external equipment. Specifically, for example, the information acquisition unit 306 acquires error information and error resolution information transmitted from the management server 10. The information acquisition unit 306 also acquires information accepted as input through the operation unit 35 (see FIG. 3). The information accepted as input through the operation unit 35 may be, for example, correction instruction information inputted into a user interface.

The display control unit 307 controls the display of various information on the display unit 36 (see FIG. 3). Specifically, for example, the display control unit 307 controls the display of a user interface on the display unit 36. Error information and error resolution information acquired by the information acquisition unit 306 are displayed on the user interface.

(Flow of Processing by Management Server)

Figure 6:
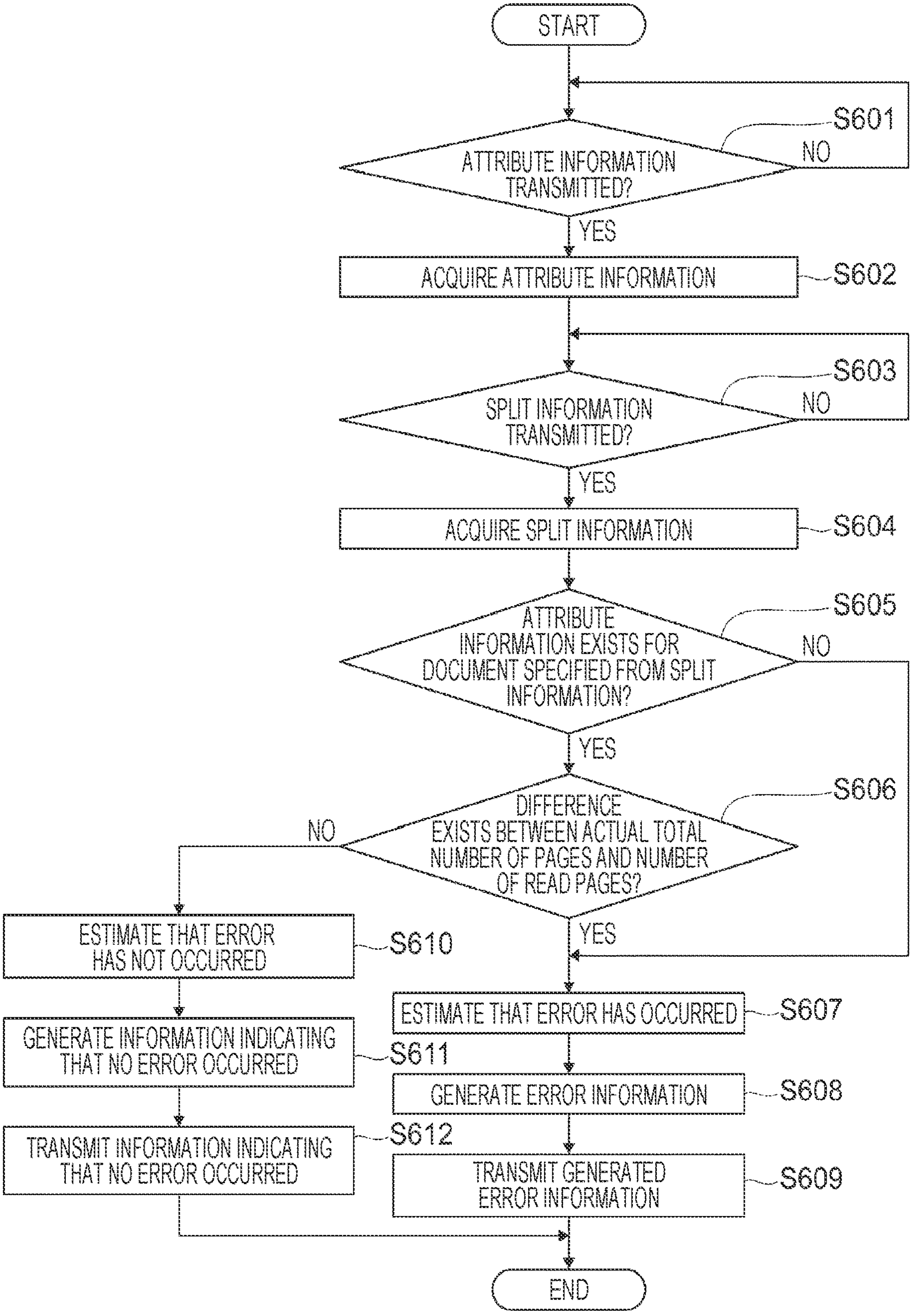
FIG. 6 is a flowchart illustrating a flow of processing related to error information from among processing by the management server.

FIG. 6 is a flowchart illustrating a flow of processing related to error information from among processing by the management server 10. If attribute information is transmitted from the image reading apparatus 30 (step 601, YES), the management server 10 acquires the attribute information (step 602). In contrast, if attribute information is not transmitted from the image reading apparatus 30 (step 601, NO), the management server 10 repeats step 601 until attribute information is transmitted from the image reading apparatus 30.

If split information is transmitted from the image reading apparatus 30 (step 603, YES), the management server 10 acquires the split information (step 604). In contrast, if split information is not transmitted from the image reading apparatus 30 (step 603, NO), the management server 10 repeats step 603 until split information is transmitted from the image reading apparatus 30.

If attribute information exists for a document specified from split information (step 605, YES) and a difference exists between the actual total number of pages and the number of read pages (step 606, YES), the management server 10 estimates that an error has occurred (step 607). Thereafter, the management server 10 generates error information (step 608), transmits the generated error information (step 609), and ends the processing (END). Here, the management server 10 generates error resolution information together with the error information. Note that the flow of the processing by which the management server 10 generates error resolution information will be described later with reference to FIG. 7.

If there is a document for which attribute information does not exist (step 605, NO), the management server 10 likewise estimates that an error has occurred (step 607) and proceeds to step 608. In contrast, if there is a document for which attribute information exists (step 605, YES) and with no difference between the actual total number of pages and the number of read pages (step 606, NO), the management server 10 estimates that an error has not occurred (step 610), generates information indicating that no error occurred (step 611), and transmits the generated information (step 612). At this point, the processing ends (END).

Figure 7:
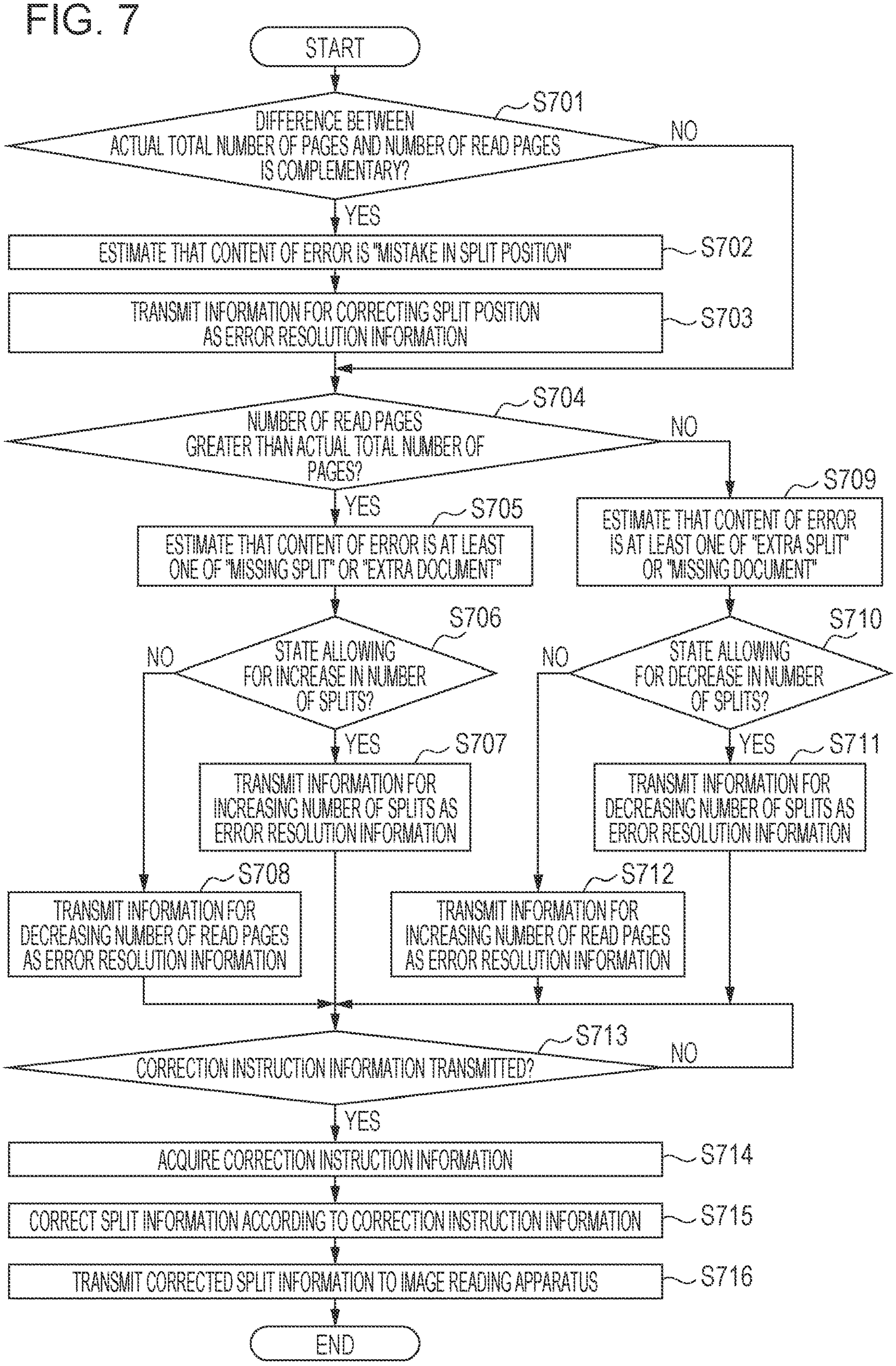
FIG. 7 is a flowchart illustrating a flow of processing related to error resolution information from among the processing by the management server.

FIG. 7 is a flowchart illustrating a flow of processing related to error resolution information from among the processing by the management server 10. If the difference between the actual total number of pages and the number of read pages is complementary (step 701, YES), the management server 10 estimates that the content of the error is "mistake in split position" (step 702). Thereafter, the management server 10 transmits information for correcting the split position as error resolution information for resolving the error of "mistake in split position" (step 703). The information for correcting the split position may be, for example, a candidate for the split position that could resolve the error.

In contrast, if the difference between the actual total number of pages and the number of read pages is not complementary (step 701, NO), and if the number of read pages is greater than the actual total number of pages (step 704, YES), the management server 10 estimates that the content of the error is at least one of "missing split" or "extra document" (step 705). Thereafter, if the current state allows for an increase in the number of splits (step 706, YES), the management server 10 transmits information for increasing the number of splits as error resolution information for resolving the error of "missing split" (step 707). The information for increasing the number of splits may be, for example, a candidate for a new split position that could resolve the error. Thereafter, the processing by the management server 10 proceeds to step 713.

Also, if the current state does not allow for an increase in the number of splits (step 706, NO), the management server 10 transmits information for decreasing the number of read pages as error resolution information for resolving the error of "extra document" (step 708). The information for decreasing the number of read pages may be, for example, a candidate for a page that could be removed to resolve the error. Thereafter, the processing by the management server 10 proceeds to step 713.

If the difference between the actual total number of pages and the number of read pages is not complementary (step 701, NO), and if the number of read pages is less than the actual total number of pages (step 704, NO), the management server 10 estimates that the content of the error is at least one of "extra split" or "missing document" (step 709). Thereafter, if the current state allows for a decrease in the number of splits (step 710, YES), the management server 10 transmits information for decreasing the number of splits as error resolution information for resolving the error of "extra split" (step 711). The information for decreasing the number of splits may be, for example, a candidate for a split position that could be removed to resolve the error. Thereafter, the processing by the management server 10 proceeds to step 713.

Also, if the current state does not allow for a decrease in the number of splits (step 710, NO), the management server 10 transmits information for increasing the number of read pages as error resolution information for resolving the error of "missing document" (step 712). The information for increasing the number of read pages may be, for example, a candidate for a page that could be added to resolve the error and a candidate for a position where the page is added. Thereafter, the processing by the management server 10 proceeds to step 713.

If correction instruction information is transmitted from the image reading apparatus 30 (step 713, YES), the management server 10 acquires the correction instruction information (step 714) and corrects the split information according to the correction instruction information (step 715). With this arrangement, the error is resolved. Additionally, the management server 10 transmits the corrected split information to the image reading apparatus 30 (step 716) and ends the processing (END). In contrast, if correction instruction information is not transmitted from the image reading apparatus 30 (step 713, NO), the management server 10 repeats step 713 until correction instruction information is transmitted from the image reading apparatus 30.

(Flow of Processing by Image Reading Apparatus)

Figure 8:
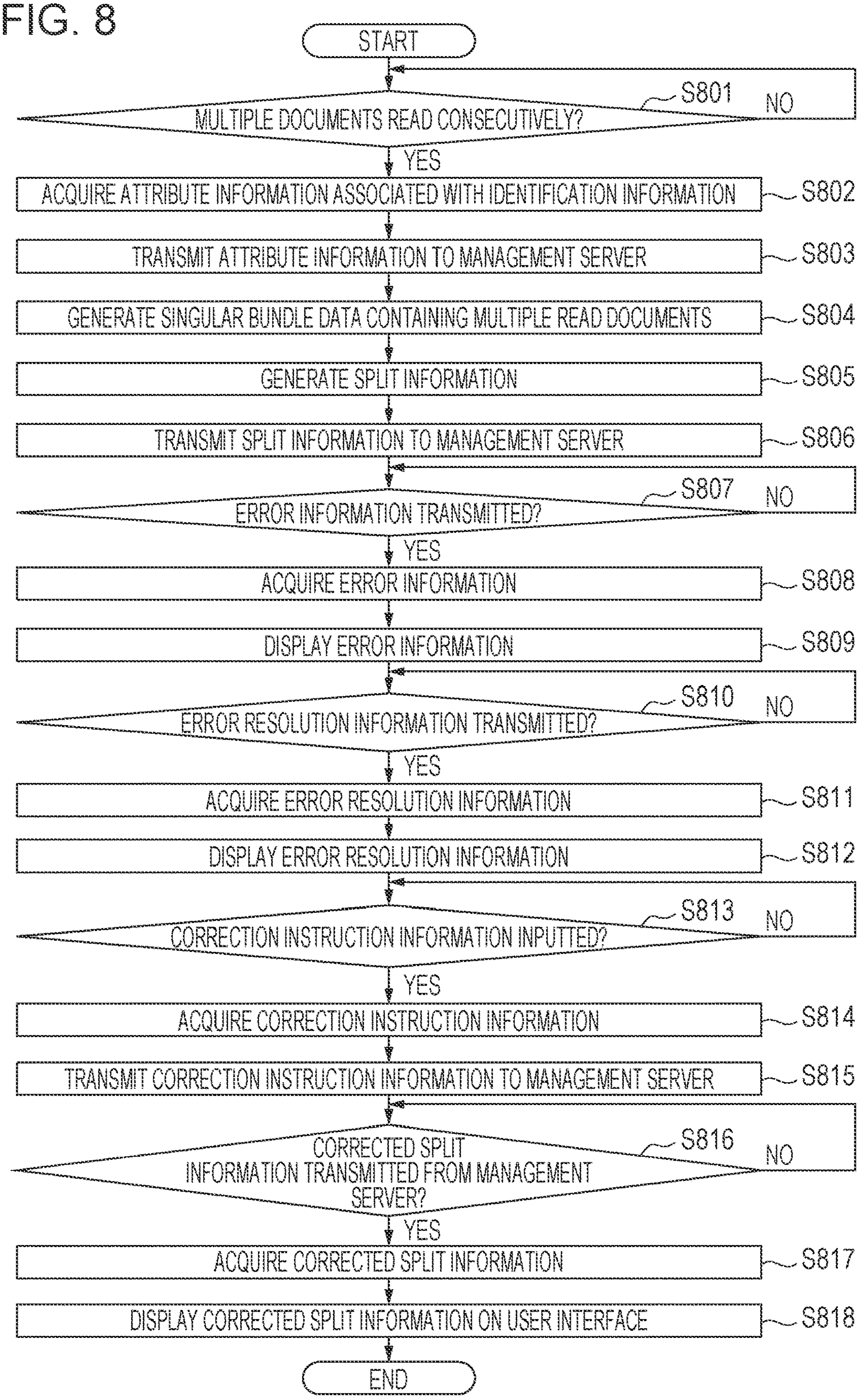
FIG. 8 is a flowchart illustrating the flow of processing by the image reading apparatus.

FIG. 8 is a flowchart illustrating the flow of processing by the image reading apparatus 30. If multiple documents are read consecutively (step 801, YES), the image reading apparatus 30 at the same time reads identification information printed on the face sheet included with each of the multiple documents, and acquires attribute information associated with the identification information (step 802). Thereafter, the image reading apparatus 30 transmits the acquired attribute information to the management server 10 (step 803). In contrast, if multiple documents are not read consecutively (step 801, NO), the image reading apparatus 30 repeats step 801.

The image reading apparatus 30 generates singular bundle data containing the multiple read documents (step 804) and generates split information indicating the result of splitting the bundle data in units of documents (step 805). Thereafter, the image reading apparatus 30 transmits the generated split information to the management server 10 (step 806).

If error information is transmitted from the management server 10 (step 807, YES), the image reading apparatus 30 acquires the error information (step 808) and displays the error information on the display unit 36 (step 809). In contrast, if error information is not transmitted from the management server 10 (step 807, NO), the image reading apparatus 30 repeats step 807 until error information is transmitted from the management server 10.

If error resolution information is transmitted from the management server 10 (step 810, YES), the image reading apparatus 30 acquires the error resolution information (step 811) and displays the error resolution information on the display unit 36 (step 812). Note that the error information and the error resolution information may be displayed at the same time or displayed separately. In contrast, if error resolution information is not transmitted from the management server 10 (step 810, NO), the image reading apparatus 30 repeats step 810 until error resolution information is transmitted from the management server 10.

If correction instruction information is inputted into the user interface (step 813, YES), the image reading apparatus 30 acquires the inputted correction instruction information (step 814) and transmits the correction instruction information to the management server 10 (step 815). In contrast, if correction instruction information is not inputted (step 813, NO), the image reading apparatus 30 repeats step 813 until correction instruction information is inputted into the user interface.

If corrected split information is transmitted from the management server 10 (step 816, YES), the image reading apparatus 30 acquires the corrected split information that is transmitted (step 817) and displays the corrected split information on the user interface (step 818). At this point, the processing ends. In contrast, if corrected split information is not transmitted from the management server 10 (step 816, NO), the image reading apparatus 30 repeats step 816 until corrected split information is transmitted from the management server 10.

Specific Example

Figure 9:
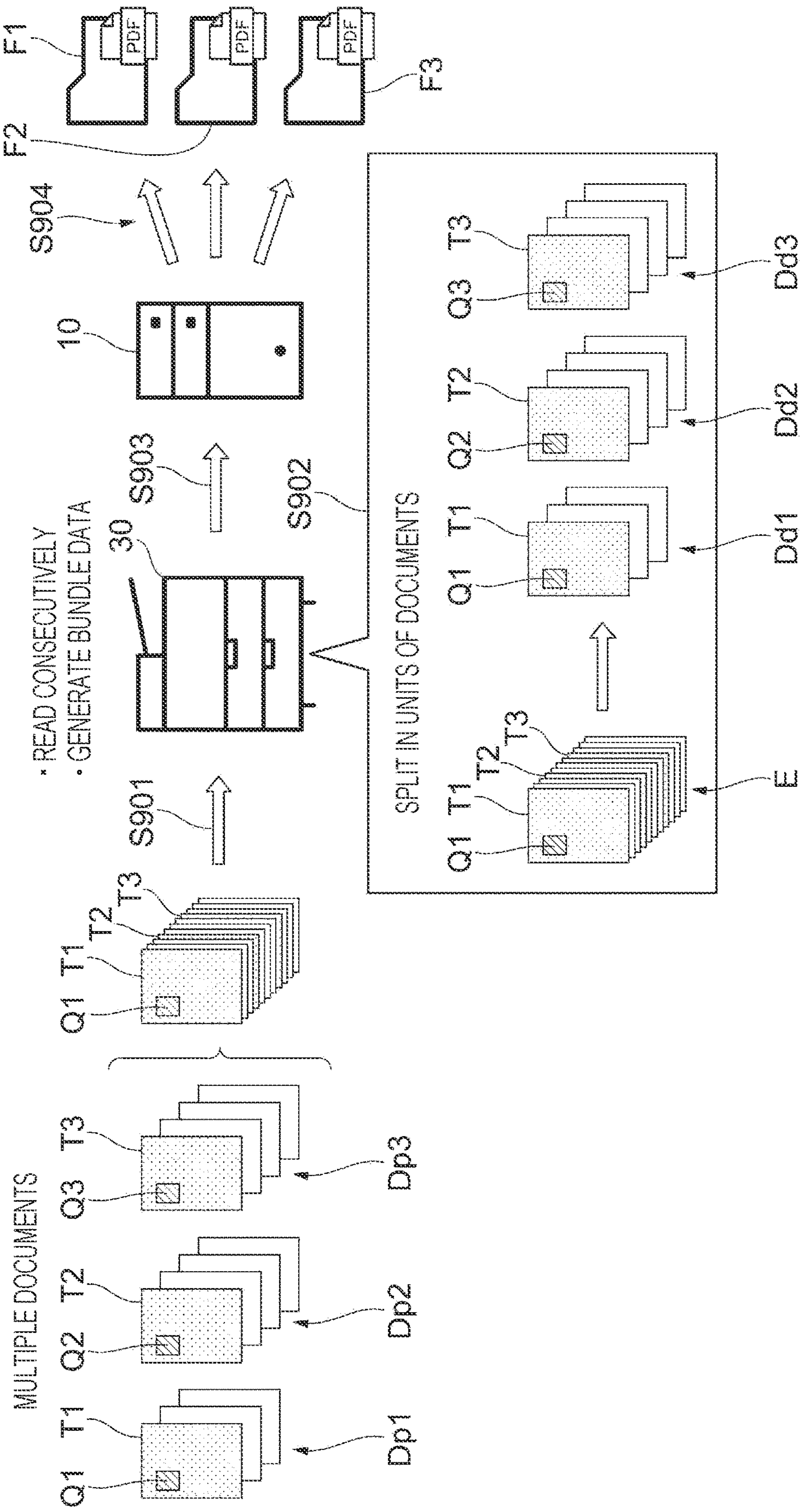
FIG. 9 is a diagram illustrating a specific example in a case where a process of splitting bundle data is performed without issues.

FIG. 9 is a diagram illustrating a specific example in a case where a process of splitting bundle data is performed without issues. In the example in FIG. 9, the image reading apparatus 30 generates bundle data E by consecutively reading paper documents Dp1 to Dp3 (step 901). In this case, face sheets T1 to T3 are respectively inserted over the top page of the paper documents Dp1 to Dp3 to be read. Identification information Q1 to Q3 is respectively printed onto the face sheets T1 to T3.

Next, the image reading apparatus 30 detects the face sheets T1 to T3 and thereby splits the bundle data E in units of documents (electronic documents Dd1 to Dd3) (step 902). Thereafter, the image reading apparatus 30 transmits split information including the electronic documents Dd1 to Dd3 to the management server 10 (step 903). Next, the management server 10 distributes and saves each of the transmitted electronic documents Dd1 to Dd3 in document folders (document folders F1 to F3) stored in the document DB 133 (see FIG. 2) (step 904).

In this way, the example in FIG. 9 represents a case in which the bundle data E generated by consecutively reading the paper documents Dp1 to Dp3 is split into each of the electronic documents Dd1 to Dd3 without issues, but the result of the processing in step 902 described above (the processing for splitting the bundle data E in units of documents) is not what the user intended. Hereinafter, FIGS. 10 to 13 will be referenced to describe specific examples of correction methods in the case in which the result of the processing for splitting the bundle data E in units of documents is not what the user intended.

FIGS. 10 to 13 are diagrams illustrating specific examples of error information and error resolution information displayed on the user interface. On the user interface illustrated in FIGS. 10 to 13, examples of error information for each of two or more electronic documents in a previous/next relationship are displayed. Specifically, examples of error information for each of the electronic documents Dd11 and Dd12 in a previous/next relationship are displayed. Note that the previous/next relationship between the electronic documents Dd11 and Dd12 is such that the electronic document Dd11 arranged in the upper part of the screen is the previous document and the electronic document Dd12 arranged in the lower part of the screen is the next document. Also, the error information displayed on the user interface includes the title of the document, the number of read pages, the estimated number of pages, and the number of extra or missing pages. Here, the "estimated number of pages" refers to the actual total number of pages in each document, estimated from the attribute information.

Figure 10:
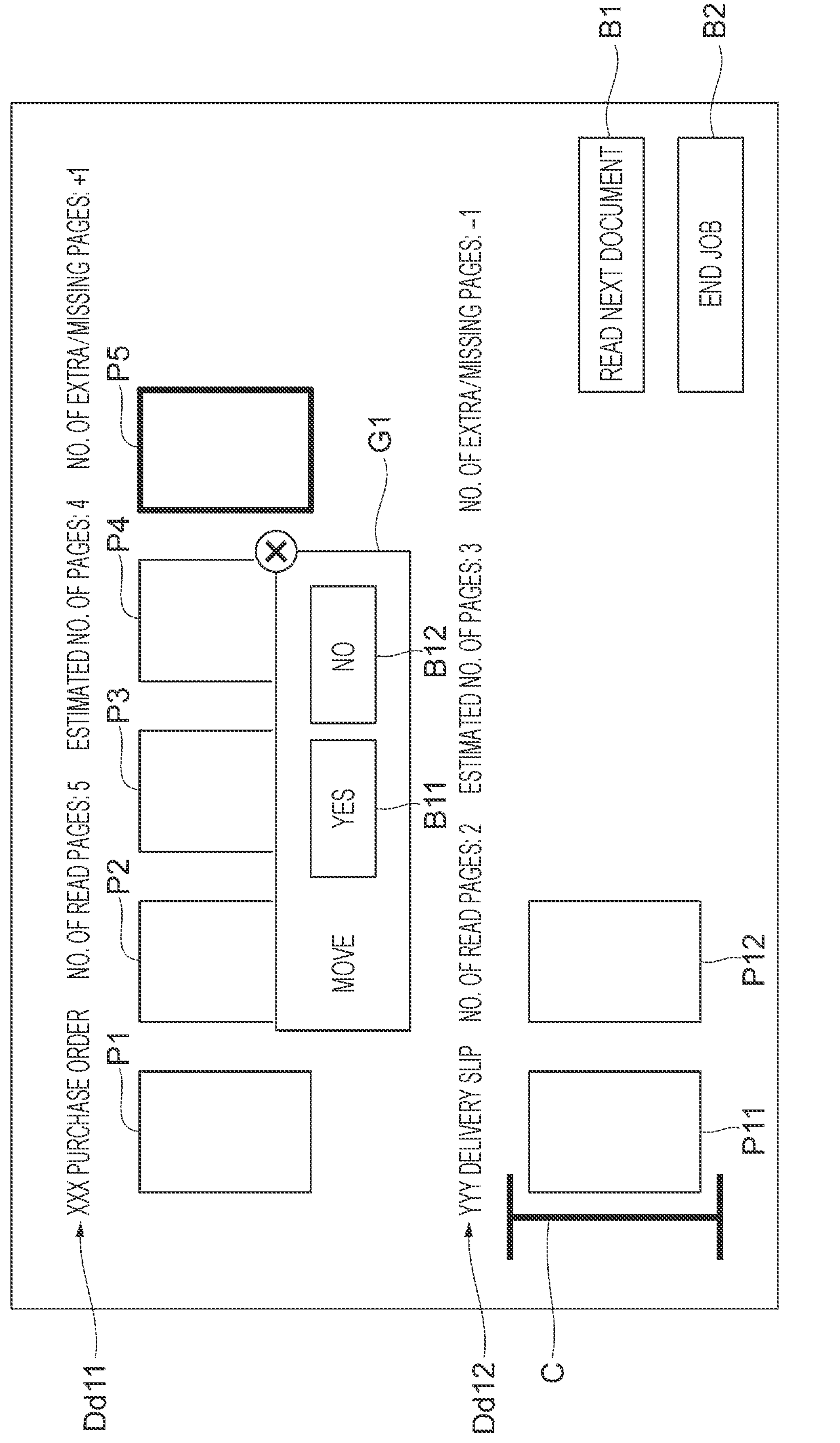
FIG. 10 is a diagram illustrating a specific example of error information and error resolution information displayed on a user interface.

FIG. 10 illustrates a specific example of error information and error resolution information displayed on the user interface of the image reading apparatus 30 in the case where the estimated content of the error is "mistake in split position". In the example in FIG. 10, for the electronic document Dd11 (document title "XXX Purchase Order"), the number of read pages is "5", the estimated number of pages is "4", and the number of extra or missing pages is "+(plus) 1". That is, for the electronic document Dd11, the actual total number of pages is "4", but since the number of read pages is "5" (pages P1 to P5), one extra page exists. Also, for the electronic document Dd12 (document title "YYY Delivery Slip"), the number of read pages is "2", the estimated number of pages is "3", and the number of extra or missing pages is "−(minus) 1". That is, for the electronic document Dd12, the actual total number of pages is "3", but since the number of read pages is "2" (pages P11 and P12), one page is missing.

In this way, attribute information exists for both electronic documents Dd11 and Dd12, and there is a difference (number of extra or missing pages) between the actual total number of pages and the number of read pages. Furthermore, the "difference (number of extra or missing pages)" is "+1" and "−1", or in other words, complementary. In this case, the management server 10 estimates that the content of the error is "mistake in split position". Such an error occurs in cases where, for example, a portion (one page) of the electronic document Dd12 is mixed in with the electronic document Dd11.

If the management server 10 estimates that the content of the error is "mistake in split position", error resolution information is displayed on the user interface of the image reading apparatus 30; specifically, a dialog box G1 enabling the user to give an instruction for correcting the mistake in the split position is displayed. In the dialog box G1, a button B11 labeled "Yes" (move) and a button B12 labeled "No" (do not move) are displayed. Also, a thick border is displayed around an icon representing the page P5 estimated to be mixed in with the electronic document Dd11, and a symbol C indicating the move destination of the page P5 is displayed. The position of the symbol C may be changed by a user operation (such as a drag operation, for example).

At this point, if the user presses the button B11 in the dialog box G1, a process for moving the page P5 to the position of the symbol C is performed. As a result, the electronic document Dd11 is updated to an electronic document containing the pages P1 to P4. Also, the electronic document Dd12 is updated to an electronic document containing the pages P5, P11, and P12. In this way, the error is resolved. In contrast, if the user presses the button B12 in the dialog box G1, the process for moving the page P5 to the position of the symbol C is not performed, and the dialog box G1 is hidden. Next, the user presses a button B1 labeled "Read Next Document" in the case of continuing to read another paper document, or the user presses a button B2 labeled "End Job" in the case of not reading another paper document.

Figure 11:
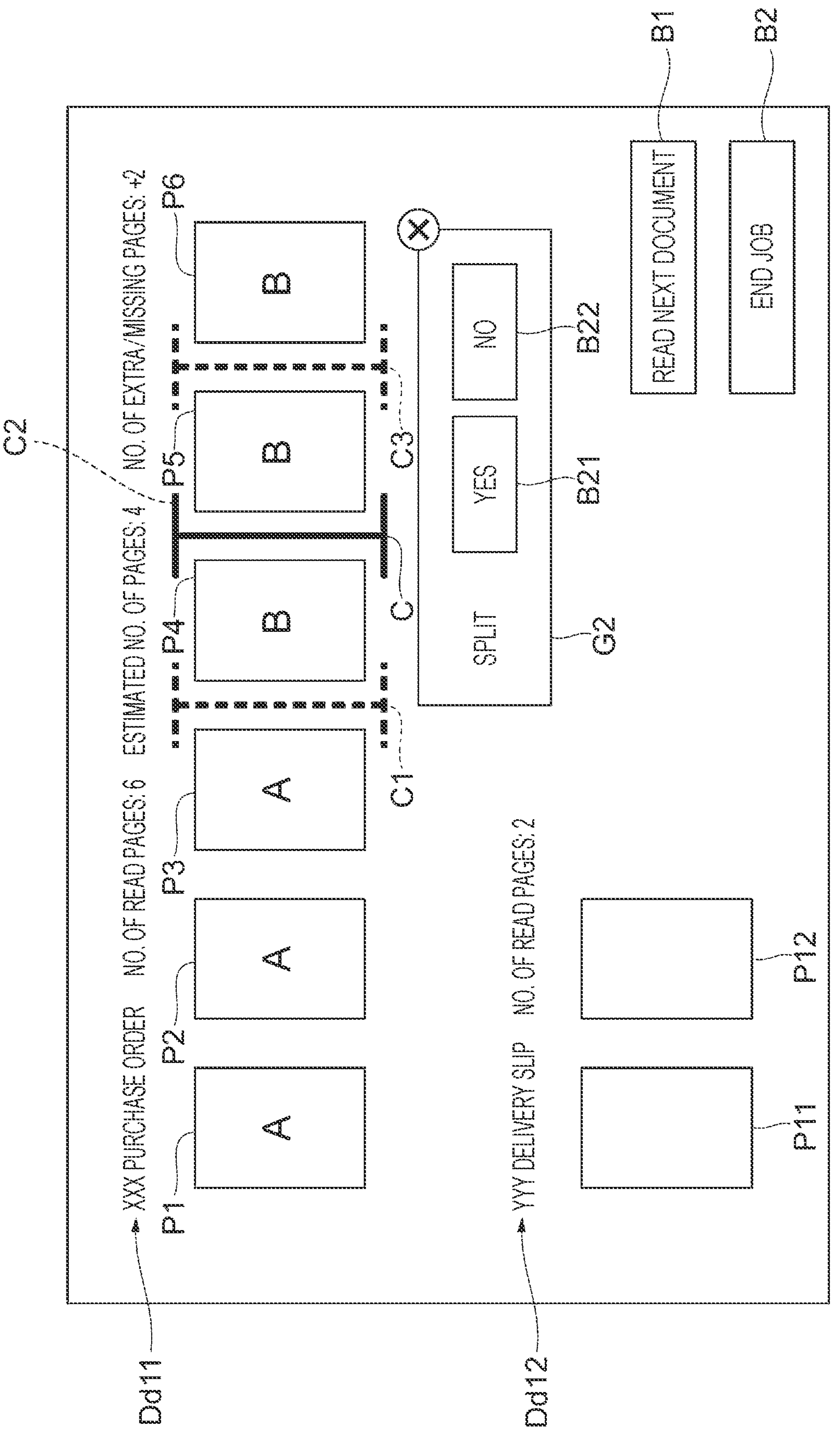
FIG. 11 is a diagram illustrating a specific example of error information and error resolution information displayed on a user interface.

FIG. 11 illustrates a specific example of error information and error resolution information displayed on the user interface of the image reading apparatus 30 in the case where the estimated content of the error is "missing split". In the example in FIG. 11, for the electronic document Dd11 (document title "XXX Purchase Order"), the number of read pages is "6", the estimated number of pages is "4", and the number of extra or missing pages is "+2". That is, for the electronic document Dd11, the actual total number of pages is "4", but since the number of read pages is "6" (pages P1 to P6), two extra pages exist. Also, for the electronic document Dd12 (document title "YYY Delivery Slip"), the number of read pages is "2", but the estimated number pages and the number of extra or missing pages are not displayed. This indicates that attribute information for the electronic document Dd12 does not exist. Accordingly, the electronic document Dd12 has been split as a document containing two pages (pages P11 and P12), although the actual total number of pages is unclear.

In this way, attribute information exists for the electronic document Dd11 and there is a difference (number of extra or missing pages) between the actual total number of pages and the number of read pages, but attribute information does not exist for the electronic document Dd12. In this case, since the number of extra or missing pages of the electronic document Dd11 is a positive number (+2), the management server 10 estimates that an error of "missing split" or "extra document" has occurred with respect to the electronic document Dd11. Of these, the error of "missing split" occurs in cases such as when pages that were originally supposed to be handled as separate documents are combined and treated as a single document. Also, the error of "extra document" occurs in cases such as when superfluous pages not originally supposed to be read are read.

In such cases, if the current state allows for an increase in the number of splits, error resolution information for "missing split" is displayed on the user interface. In contrast, if the current state does not allow for an increase in the number of splits, error resolution information for "extra document" is displayed on the user interface. FIG. 11 illustrates a specific example of the user interface on which information for resolving the error of "missing split" is displayed. Note that a specific example of the user interface on which information for resolving the error of "extra document" is displayed will be described later with reference to FIG. 12.

As illustrated in FIG. 11, on the user interface, symbols C1 to C3 indicating candidates for a new split position that could resolve the error and a dialog box G2 enabling the user to give an instruction for increasing the number of splits are displayed. Of these, the symbol C1 is displayed as a candidate for a split position based on a difference in the document title. In the example in FIG. 11, the character "A" is displayed as the document title on each of the pages P1 to P3. On the other hand, the character "B" is displayed as the document title on each of the pages P4 to P6. Accordingly, the symbol C1 is displayed between the pages P3 and P4, the position where the document title changes from "A" to "B".

Also, the symbol C2 is displayed as a candidate for a split position based on the estimated number of pages. In the example in FIG. 11, the estimated number of pages is "4". Accordingly, the symbol C2 is displayed between the page P4 to be the last page of the electronic document Dd11 and the page P5 to be a separate document. Also, the symbol C3 is displayed as a candidate for a split position based on a difference in the attribute information. In this case, the attribute information may be, for example, a case ID or a supervisor ID. As an example, assume that the pages P1 to P5 each have a common case ID, which is different from the case ID of the page P6. In this case, as illustrated in FIG. 11, the symbol C3 is displayed between the pages P5 and P6. Note that the symbol C2 (dashed line) is not visible in FIG. 11, and this is because the symbol C (solid line) with which the user performs an operation of designating the position exists at a position overlapping the symbol C2 (dashed line) (that is, the position of the symbol C2 is currently designated by the user).

In the dialog box G2, a button B21 labeled "Yes" (split) and a button B22 labeled "No" (do not split) are displayed. At this point, if the user presses the button B21 in the dialog box G2, a new split is created at the position of the symbol C2. As a result, the electronic document Dd11 is updated to an electronic document containing the pages P1 to P4. With this arrangement, the error of "missing split" for the electronic document Dd11 is resolved. In contrast, if the user presses the button B22 in the dialog box G2, the process for increasing the number of splits is not performed, and the dialog box G2 is hidden.

Figure 12:
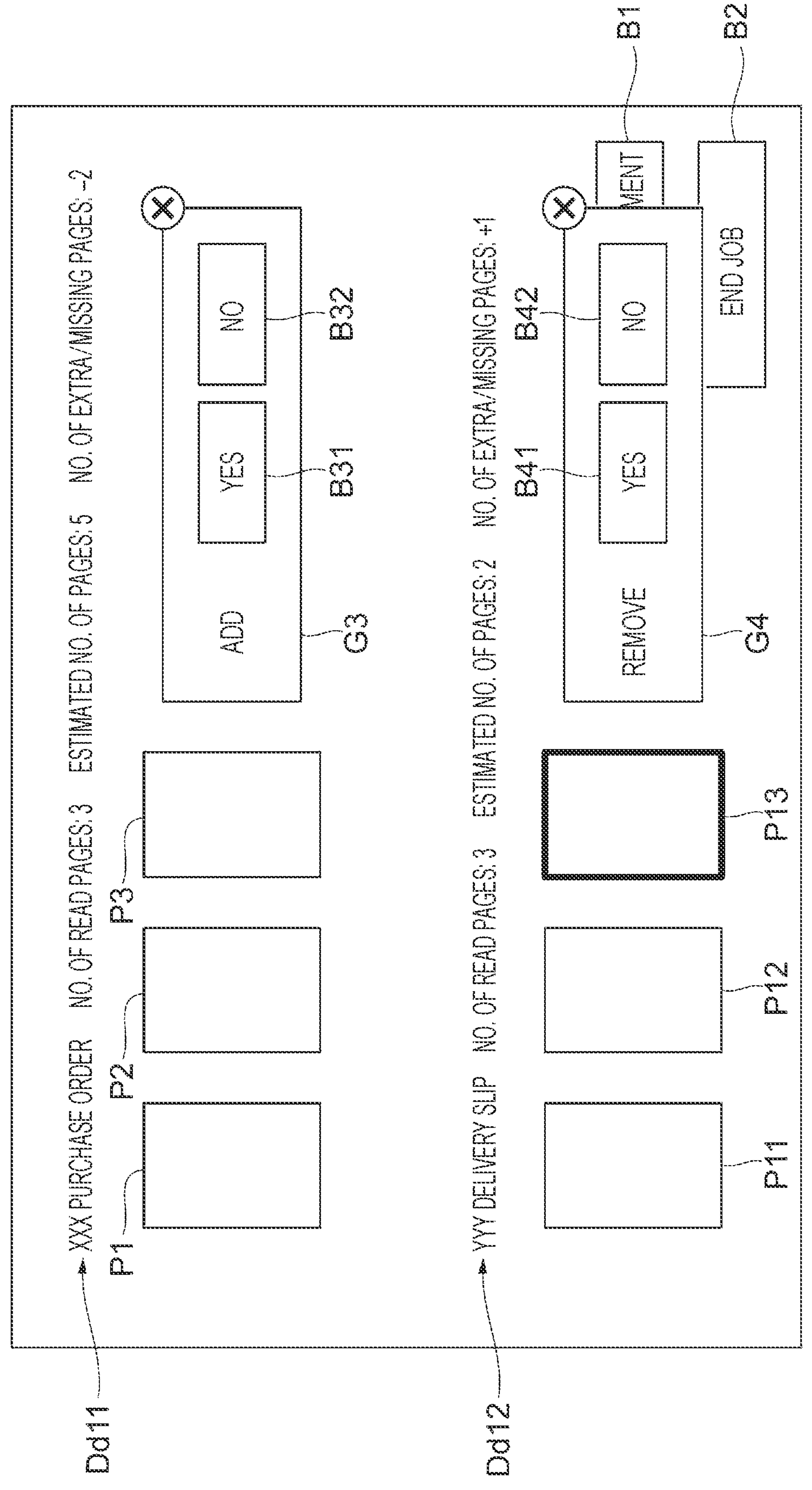
FIG. 12 is a diagram illustrating a specific example of error information and error resolution information displayed on a user interface.

FIG. 12 illustrates a specific example of error information and error resolution information displayed on the user interface of the image reading apparatus 30 in the case where the estimated content of the error is "extra document" and "missing document". In the example in FIG. 12, for the electronic document Dd11 (document title "XXX Purchase Order"), the number of read pages is "3", the estimated number of pages is "5", and the number of extra or missing pages is "−2". That is, for the electronic document Dd11, the actual total number of pages is "5", but since the number of read pages is "3" (pages P1 to P3), two pages are missing. Also, for the electronic document Dd12 (document title "YYY Delivery Slip"), the number of read pages is "3", the estimated number of pages is "2", and the number of extra or missing pages is "+1". That is, for the electronic document Dd12, the actual total number of pages is "2", but since the number of read pages is "3" (pages P11 to P13), one extra page exists.

In this way, attribute information exists for both electronic documents Dd11 and Dd12, and there is a difference (that is, extra or missing pages) between the actual total number of pages and the number of read pages. Furthermore, the number of missing pages "−2" of the electronic document Dd11 is not complementary with the number of extra pages "+1" of the electronic document Dd12. In this case, since the number of extra or missing pages of the electronic document Dd11 is a negative number (−2), the management server 10 estimates that an error of "missing document" has occurred with respect to the electronic document Dd11. The error of "missing document" occurs in cases such as when the user forgets to insert the pages of a document to be read. Also, since the number of extra or missing pages of the electronic document Dd12 is a positive number (+1), the management server 10 estimates that an error of "extra document" has occurred with respect to the electronic document Dd12.

If the management server 10 estimates that the content of the error is "missing document", error resolution information is displayed on the user interface of the image reading apparatus 30; specifically, a dialog box G3 for increasing the number of read pages is displayed. In the dialog box G3, a button B31 labeled "Yes" (add) and a button B32 labeled "No" (do not add) are displayed. At this point, if the user presses the button B31 in the dialog box G3, a process for increasing the number of read pages is performed. Specifically, reading for adding two new pages is performed. As a result, although not illustrated, the electronic document Dd11 is updated to an electronic document containing five pages.

Also, if the management server 10 estimates that the content of the error is "extra document", error resolution information is displayed on the user interface of the image reading apparatus 30; specifically, a candidate for the page that could be removed to resolve the error and a dialog box G4 for decreasing the number of read pages is displayed. In the example in FIG. 12, a thick border is displayed around the page P13 to be removed which exceeds (by one page) the number "2" of estimated pages as the "candidate for a page that could be removed to resolve the error".

In the dialog box G4, a button B41 labeled "Yes" (remove) and a button B42 labeled "No" (do not remove) are displayed. At this point, if the user presses the button B41 in the dialog box G4, a process for decreasing the number of read pages is performed. Specifically, the page P13 is removed. As a result, although not illustrated, the electronic document Dd12 is updated to an electronic document containing the pages P11 and P12. With this arrangement, the error is resolved.

Figure 13:
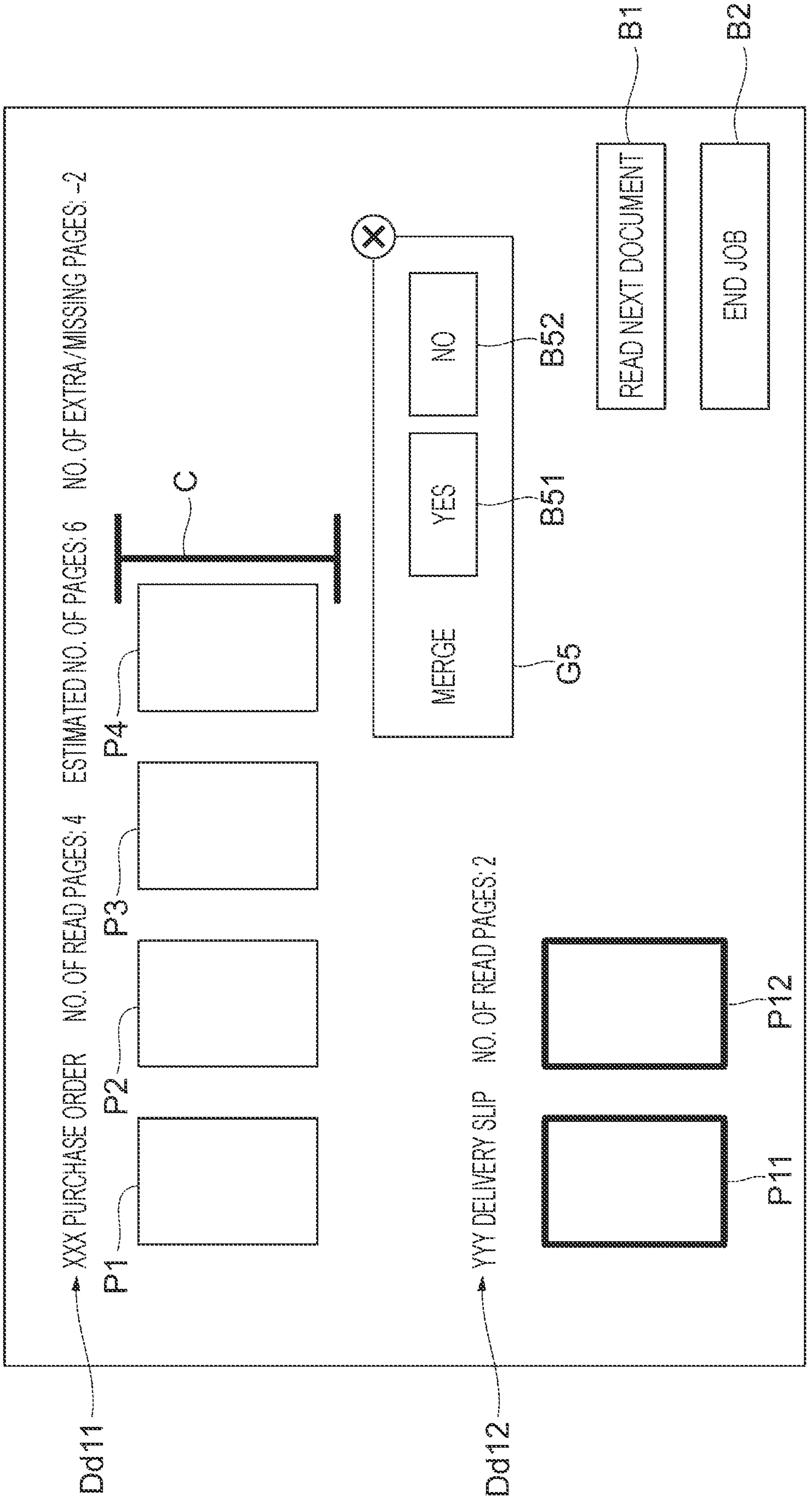
FIG. 13 is a diagram illustrating a specific example of error information and error resolution information displayed on a user interface.

FIG. 13 illustrates a specific example of error information and error resolution information displayed on the user interface of the image reading apparatus 30 in the case where the estimated content of the error is "extra split" or "missing document". In the example in FIG. 13, for the electronic document Dd11 (document title "XXX Purchase Order"), the number of read pages is "4", the estimated number of pages is "6", and the number of extra or missing pages is "−2". That is, for the electronic document Dd11, the actual total number of pages is "6", but since the number of read pages is "4" (pages P1 to P4), two pages are missing. Also, for the electronic document Dd12 (document title "YYY Delivery Slip"), the number of read pages is "2", but the estimated number pages and the number of extra or missing pages are not displayed. This indicates that attribute information for the electronic document Dd12 does not exist. Accordingly, the electronic document Dd12 has been split as a document containing two pages (pages P11 and P12), although the actual total number of pages is unclear.

In this way, attribute information exists for the electronic document Dd11 and there is a difference (number of extra or missing pages) between the actual total number of pages and the number of read pages, but attribute information does not exist for the electronic document Dd12. In this case, since the number of extra or missing pages of the electronic document Dd11 is a negative number (−2), the management server 10 estimates that an error of "extra split" or "missing document" has occurred with respect to the electronic document Dd11. Of these, the error of "extra split" occurs in cases such when an unnecessary split exists. Also, the error of "missing document" occurs in cases such as when the user forgets to insert one or more pages to be read.

In such cases, the management server 10 estimates the content of the error on the basis of the difference between the total number of pages combining the number of read pages of the electronic document Dd11 and the number of read pages of the electronic document Dd12, and the estimated number of pages of the electronic document Dd11. Specifically, the error of "extra split" is estimated if the total number of pages combining the number of read pages of the electronic document Dd11 and the number of read pages of the electronic document Dd12 is the same as the estimated number of pages of the electronic document Dd11. The error of "extra split" may occur in cases where, for example, the electronic document Dd12 is an attachment of the electronic document Dd11.

If the management server 10 estimates that the content of the error is "extra split", error resolution information is displayed on the user interface of the image reading apparatus 30; specifically, as illustrated in FIG. 13, a thick border is displayed around all pages included in the document to be merged out of the documents in the previous/next relationship, a symbol C indicating the position where the previous/next documents are to be merged, and a dialog box G5 for decreasing the number of splits and merging the documents in the previous/next relationship are displayed. In the dialog box G5, a button B51 labeled "Yes" (merge) and a button B52 labeled "No" (do not merge) are displayed.

At this point, if the user presses the button B51 in the dialog box G5, a process for decreasing the number of splits and merging the documents in the previous/next relationship is performed. Specifically, a process for merging the electronic document Dd11 containing the pages P1 to P4 with the electronic document Dd12 containing the pages P11 and P12 is performed. As a result, although not illustrated, the electronic document Dd11 is updated to an electronic document containing the pages P1 to P4, P11, and P12, for a total of six pages. Also, the electronic document Dd12 has been merged with the electronic document Dd11 and therefore is removed. This arrangement resolves the error of "extra split", which is estimated if the total number of pages combining the number of read pages of the electronic document Dd11 and the number of read pages of the electronic document Dd12 is the same as the estimated number of pages of the electronic document Dd11.

Also, although not illustrated, the management server 10 estimates the error of "extra document" if the estimated number of pages of the electronic document Dd11 is less than the total number of pages combining the number of read pages of the electronic document Dd11 and the number of read pages of the electronic document Dd12. Also, if the estimated number of pages of the electronic document Dd11 is greater than the total number of pages combining the number of read pages of the electronic document Dd11 and the number of read pages of the electronic document Dd12, the management server 10 generates error information and error resolution information with consideration for the attribute information and the split information for an electronic document, not illustrated, that follows after the electronic document Dd12.

Other Exemplary Embodiments

The foregoing describes an exemplary embodiment of the present disclosure, but the present disclosure is not limited to the exemplary embodiment described above. Moreover, the effects produced by an exemplary embodiment of the present disclosure are not limited to those indicated in relation to the exemplary embodiment described above. For example, the configuration of the information processing system 1 illustrated in FIG. 1, the hardware configuration of the management server 10 illustrated in FIG. 2, and the hardware configuration of the image reading apparatus 30 illustrated in FIG. 3 are all merely illustrative examples for achieving an objective of the present disclosure and are not particularly limiting. Likewise, the functional configuration of the management server 10 illustrated in FIG. 4 and the functional configuration of the image reading apparatus 30 illustrated in FIG. 5 are merely illustrative examples and are not particularly limiting. Insofar as functionality for executing the processes described above as a whole is provided in the information processing system 1 of FIG. 1, the functional configuration to be used for achieving the functionality is not limited to the examples in FIGS. 4 and 5.

Also, the sequence of the steps in the processing by the management server 10 illustrated in FIGS. 6 and 7 and the sequence of the steps in the processing by the image reading apparatus 30 illustrated in FIG. 8 are merely illustrative examples and are not particularly limiting. The processes may not only be performed in a time series following the sequence of steps illustrated in the flowcharts, but may also be performed in parallel or individually, without necessarily being performed in a time series. Moreover, the specific examples in FIGS. 9 to 13 are merely examples and are not particularly limiting.

For example, in the exemplary embodiment described above, the management server 10 is configured to perform the processing for estimating an error, but the configuration is not limited thereto. For example, the image reading apparatus 30 may also perform the processing of the information processing system 1 described above in a standalone manner.

Also, in the exemplary embodiment described above, the image reading apparatus 30 specifies the number of estimated pages on the basis of attribute information for each document obtained by reading the face sheet of each document, but the configuration is not limited thereto. For example, the number of estimated pages may also be specified on the basis of information expressing a number for each page, the number being obtained from a result of OCR analysis applied to the body text of a read document.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

(Appendix)

(((1)))

An information processing system comprising:

one or more processors configured to:

acquire attribute information indicating an attribute of a document containing one or more pages and split information indicating a result of splitting in units of documents after a plurality of documents are read consecutively; and estimate an error for each split document on a basis of a difference between a total number of pages in each document obtained from the attribute information and a number of read pages in each split document obtained from the split information.

(((2)))

The information processing system according to (((1))), wherein the one or more processors are configured to estimate that the error has not occurred with respect to a document among the split documents with no difference, and estimate that the error has occurred with respect to a document with the difference and a document for which the attribute information does not exist.

(((3)))

The information processing system according to (((1))) or (((2))), wherein the one or more processors are configured to cause, upon estimating that the error has occurred, information indicating that the error is estimated to have occurred and information for resolving the error to be displayed on a user interface.

(((4)))

The information processing system according to any one of (((1))) to (((3))), wherein with respect to a document among the split documents for which the error is estimated to have occurred, the one or more processors are configured to estimate the error on a basis of a presence or absence of the attribute information for each of the document and a document before or after the document, and a relationship of the difference.

(((5)))

The information processing system according to any one of (((1))) to (((4))), wherein with respect to a document among the split documents for which the error is estimated to have occurred, the one or more processors are configured to estimate that a mistake in a split position has occurred as content of the error if the attribute information exists for each of the document and the document before or after the document, and the difference is complementary.

(((6)))

The information processing system according to any one of (((1))) to (((5))), wherein the one or more processors are configured to cause information for correcting a split position to be displayed on a user interface as information for resolving the error.

(((7)))

The information processing system according to (((6))), wherein the one or more processors are configured to cause a candidate for a split position that could resolve the error to be displayed on the user interface as the information for correcting the split position.

(((8)))

The information processing system according to any one of (((1))) to (((4))), wherein with respect to a document among the split documents for which the error is estimated to have occurred, the one or more processors are configured to estimate content of the error on a basis of whether the total number of pages or the number of read pages is greater if the attribute information exists for each of the document and the document before or after the document, and the difference is not complementary.

(((9)))

The information processing system according to (((8))), wherein if the number of read pages is greater than the total number of pages, the one or more processors are configured to estimate that the content of the error is at least one of an insufficient number of splits or an excessive number of read pages.

(((10)))

The information processing system according to (((9))), wherein the one or more processors are configured to:

cause, in a case that allows for an increase in the number of splits, information for increasing the number of splits to be displayed on a user interface as information for resolving the insufficient number of splits; and cause, in a case that does not allow for an increase in the number of splits, information for decreasing the number of read pages to be displayed on the user interface as information for resolving the excessive number of read pages.

(((11)))

The information processing system according to (((10))), wherein the one or more processors are configured to cause a candidate for a new split position that could resolve the error to be displayed on the user interface as the information for increasing the number of splits.

(((12)))

The information processing system according to (((10))), wherein the one or more processors are configured to cause a candidate for a page that could be removed to resolve the error to be displayed on the user interface as the information for decreasing the number of read pages.

(((13)))

The information processing system according to (((8))), wherein if the number of read pages is less than the total number of pages, the one or more processors are configured to estimate that the content of the error is at least one of an excessive number of splits or an insufficient number of pages in the document prior to being read.

(((14)))

The information processing system according to (((13))), wherein the one or more processors are configured to:

cause, in a case that allows for a decrease in the number of splits, information for decreasing the number of splits to be displayed on a user interface as information for resolving the excessive number of splits; and cause, in a case that does not allow for a decrease in the number of splits, information for increasing the number of read pages to be displayed on the user interface as information for resolving the insufficient number of pages in the document prior to being read.

(((15)))

The information processing system according to (((14))), wherein the one or more processors are configured to cause a candidate for a split position that could be removed to resolve the error to be displayed on the user interface as the information for decreasing the number of splits.

(((16)))

The information processing system according to (((14))), wherein the one or more processors are configured to cause a candidate for a page that could be added to resolve the error and a candidate for a position where the page is added to be displayed on the user interface as the information for increasing the number of read pages.

(((17)))

The information processing system according to (((16))), wherein the one or more processors are configured to cause a page included in a newly read document to be displayed on the user interface as the candidate for a page that could be added to resolve the error.

(((18)))

The information processing system according to (((17))), wherein the one or more processors are configured to determine, on a basis of a result of comparing the attribute information for the document with the difference to the attribute information for the newly read document, whether the newly read document is a document that is read to replace the document with the difference.

(((19)))

The information processing system according to (((18))), wherein the attribute information for the document with the difference is a feature of an identification sheet included in the document with the difference, and the attribute information for the newly read document for replacement is a feature of an identification sheet included in the newly read document for replacement.

(((20)))

An information processing apparatus comprising:

a processor configured to:

acquire attribute information indicating an attribute of a document containing one or more pages and split information indicating a result of splitting in units of documents after consecutively reading a plurality of documents;

estimate an error for each split document on a basis of a difference between a total number of pages in each document obtained from the attribute information and a number of read pages in each split document obtained from the split information; and cause information indicating that the error is estimated to have occurred and information for resolving the error to be displayed on a user interface.

(((21)))

A program causing a computer to execute a process comprising:

acquiring attribute information indicating an attribute of a document containing one or more pages and split information indicating a result of splitting in units of documents after a plurality of documents are read consecutively; and estimating an error for each split document on a basis of a difference between a total number of pages in each document obtained from the attribute information and a number of read pages in each split document obtained from the split information.

What is claimed is:

1. An information processing system comprising:

one or more processors configured to:

acquire attribute information including a total number of pages of a document containing one or more pages and split information indicating a result of splitting in units of documents after a plurality of documents are read consecutively;

estimate an error for each split document on a basis of a difference between the total number of pages in each document obtained from the attribute information and a number of read pages in each split document obtained from the split information; and determine whether the error has occurred on a basis of the estimating, and cause information indicating that the error is estimated to have occurred and information for resolving the error to be displayed on a user interface in response to determining that the error has occurred.

2. The information processing system according to claim 1, wherein the one or more processors are configured to estimate that the error has not occurred with respect to a document among the split documents with no difference, and estimate that the error has occurred with respect to a document with the difference and a document for which the attribute information does not exist.

3. The information processing system according to claim 2, wherein with respect to a document among the split documents for which the error is estimated to have occurred, the one or more processors are configured to estimate the error on a basis of a presence or absence of the attribute information for each of the document and a document before or after the document, and a relationship of the difference.

4. The information processing system according to claim 3, wherein with respect to a document among the split documents for which the error is estimated to have occurred, the one or more processors are configured to estimate that a mistake in a split position has occurred as content of the error if the attribute information exists for each of the document and the document before or after the document, and the difference is complementary.

5. The information processing system according to claim 4, wherein the one or more processors are configured to cause information for correcting a split position to be displayed on the user interface as information for resolving the error.

6. The information processing system according to claim 5, wherein the one or more processors are configured to cause a candidate for a split position that could resolve the error to be displayed on the user interface as the information for correcting the split position.

7. The information processing system according to claim 3, wherein with respect to a document among the split documents for which the error is estimated to have occurred, the one or more processors are configured to estimate content of the error on a basis of whether the total number of pages or the number of read pages is greater if the attribute information exists for each of the document and the document before or after the document, and the difference is not complementary.

8. The information processing system according to claim 7, wherein if the number of read pages is greater than the total number of pages, the one or more processors are configured to estimate that the content of the error is at least one of an insufficient number of splits or an excessive number of read pages.

9. The information processing system according to claim 8, wherein the one or more processors are configured to:

cause, in a case that allows for an increase in the number of splits, information for increasing the number of splits to be displayed on a user interface as information for resolving the insufficient number of splits; and cause, in a case that does not allow for an increase in the number of splits, information for decreasing the number of read pages to be displayed on the user interface as information for resolving the excessive number of read pages.

10. The information processing system according to claim 9, wherein the one or more processors are configured to cause a candidate for a new split position that could resolve the error to be displayed on the user interface as the information for increasing the number of splits.

11. The information processing system according to claim 9, wherein the one or more processors are configured to cause a candidate for a page that could be removed to resolve the error to be displayed on the user interface as the information for decreasing the number of read pages.

12. The information processing system according to claim 7, wherein if the number of read pages is less than the total number of pages, the one or more processors are configured to estimate that the content of the error is at least one of an excessive number of splits or an insufficient number of pages in the document prior to being read.

13. The information processing system according to claim 12, wherein the one or more processors are configured to:

cause, in a case that allows for a decrease in the number of splits, information for decreasing the number of splits to be displayed on a user interface as information for resolving the excessive number of splits; and cause, in a case that does not allow for a decrease in the number of splits, information for increasing the number of read pages to be displayed on the user interface as information for resolving the insufficient number of pages in the document prior to being read.

14. The information processing system according to claim 13, wherein the one or more processors are configured to cause a candidate for a split position that could be removed to resolve the error to be displayed on the user interface as the information for decreasing the number of splits.

15. The information processing system according to claim 13, wherein the one or more processors are configured to cause a candidate for a page that could be added to resolve the error and a candidate for a position where the page is added to be displayed on the user interface as the information for increasing the number of read pages.

16. The information processing system according to claim 15, wherein the one or more processors are configured to cause a page included in a newly read document to be displayed on the user interface as the candidate for a page that could be added to resolve the error.

17. The information processing system according to claim 16, wherein the one or more processors are configured to determine, on a basis of a result of comparing the attribute information for the document with the difference to the attribute information for the newly read document, whether the newly read document is a document that is read to replace the document with the difference.

18. The information processing system according to claim 17, wherein the attribute information for the document with the difference is a feature of an identification sheet included in the document with the difference, and the attribute information for the newly read document for replacement is a feature of an identification sheet included in the newly read document for replacement.

19. A non-transitory computer readable medium storing a program causing a computer to execute a process comprising:

acquiring attribute information including a total number of pages of a document containing one or more pages and split information indicating a result of splitting in units of documents after a plurality of documents are read consecutively;

estimating an error for each split document on a basis of a difference between the total number of pages in each document obtained from the attribute information and a number of read pages in each split document obtained from the split information; and determining whether the error has occurred on a basis of the estimating, and causing information indicating that the error is estimated to have occurred and information for resolving the error to be displayed on a user interface in response to determining that the error has occurred.

20. An information processing system comprising:

one or more processors configured to:

acquire attribute information indicating an attribute of a document containing one or more pages and split information indicating a result of splitting in units of documents after a plurality of documents are read consecutively; and estimate an error for each split document on a basis of a difference between a total number of pages in each document obtained from the attribute information and a number of read pages in each split document obtained from the split information, wherein the one or more processors are configured to estimate that the error has not occurred with respect to a document among the split documents with no difference, and estimate that the error has occurred with respect to a document with the difference and a document for which the attribute information does not exist, and with respect to a document among the split documents for which the error is estimated to have occurred, the one or more processors are configured to estimate the error on a basis of a presence or absence of the attribute information for each of the document and a document before or after the document, and a relationship of the difference.

* * * * *